United States Patent [19]
de Greef

[11] Patent Number: 5,704,733
[45] Date of Patent: Jan. 6, 1998

[54] METHOD AND APPARATUS FOR HANDLING AGRICULTURAL OR HORTICULTURAL PRODUCE

[75] Inventor: Jacob Hendrik de Greef, Waardenburg, Netherlands

[73] Assignee: de Greef's Wagen-, Carrosserie-en Machinebouw B.V., Tricht, Netherlands

[21] Appl. No.: 611,443

[22] Filed: Mar. 1, 1996

[30] Foreign Application Priority Data

Mar. 2, 1995 [NL] Netherlands ............................ 9500413

[51] Int. Cl.⁶ ............................................. B65G 53/02
[52] U.S. Cl. ........................... 406/79; 406/83; 406/106; 406/108; 406/154
[58] Field of Search .................... 406/79, 83, 106, 406/108, 154, 191, 198; 99/406

[56] References Cited

U.S. PATENT DOCUMENTS

| | | | |
|---|---|---|---|
| 1,707,786 | 4/1929 | Ehrhart | 99/406 |
| 2,092,499 | 9/1937 | Carpenter | 99/406 |
| 3,545,630 | 12/1970 | Ivanto. | |
| 4,474,525 | 10/1984 | Murao. | |
| 5,242,250 | 9/1993 | Compagnoni. | |
| 5,421,148 | 6/1995 | Caraway | 406/198 |

FOREIGN PATENT DOCUMENTS

| | | | |
|---|---|---|---|
| 2175630 | 10/1973 | France. | |
| 89723 | 3/1990 | Japan | 406/106 |

*Primary Examiner*—Gary C. Hoge
*Attorney, Agent, or Firm*—Webb Ziesenheim Bruening Logsdon Orkin & Hanson, P.C.

[57] ABSTRACT

The invention relates to a method for handling agricultural or horticultural products, for instance tomatoes or apples, wherein the products are transported in at least one reservoir filled with water substantially at a transporting level determined by the water surface in accordance with at least one transport path in the direction from a supply to a discharge.

In order to reduce the required transporting space the method according to the invention has the feature that in order to buffer products the upper level of at least one product mass is carried by a level adjusting buffering device to a level other than the transporting level.

The invention also relates to an apparatus for performing this method.

8 Claims, 6 Drawing Sheets

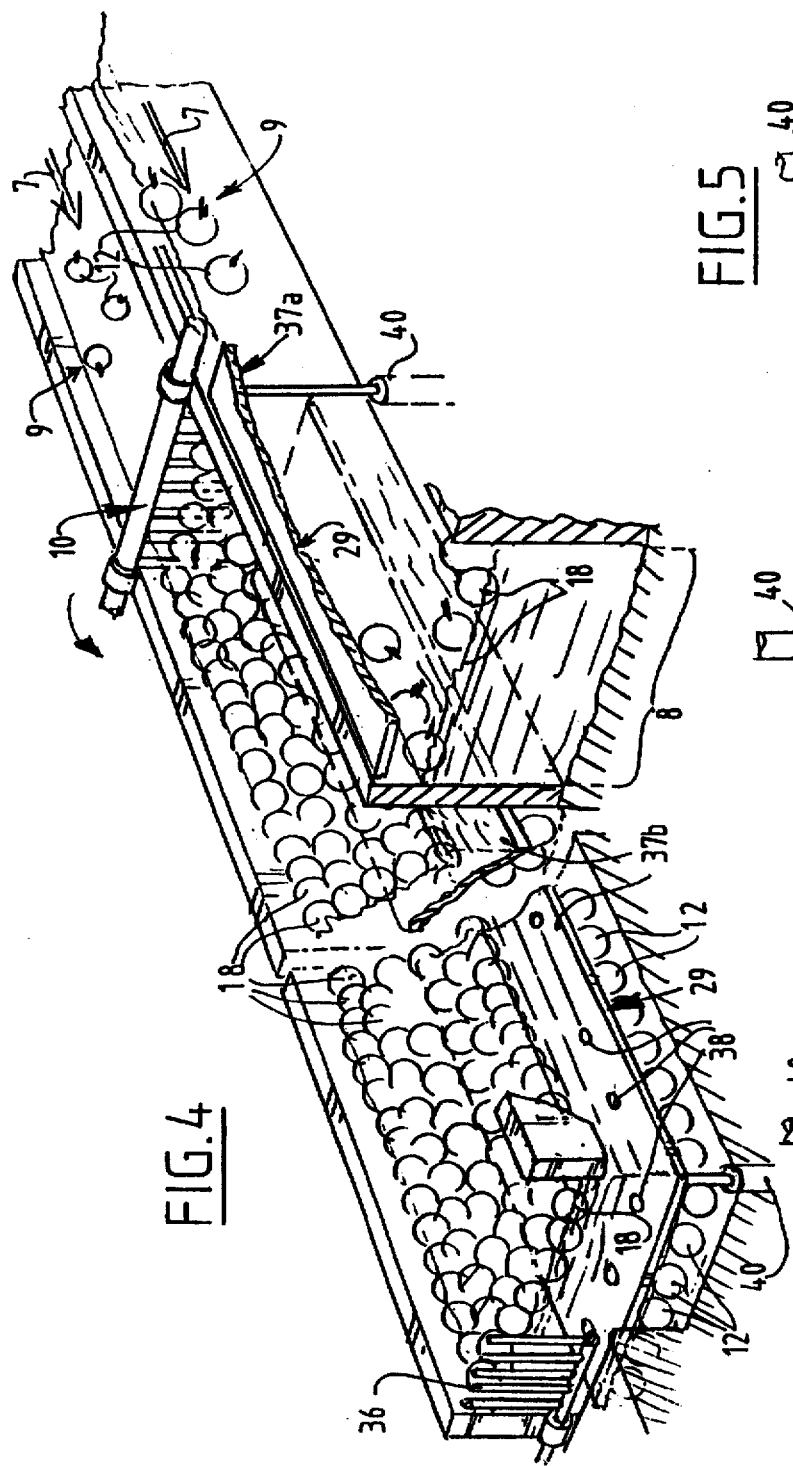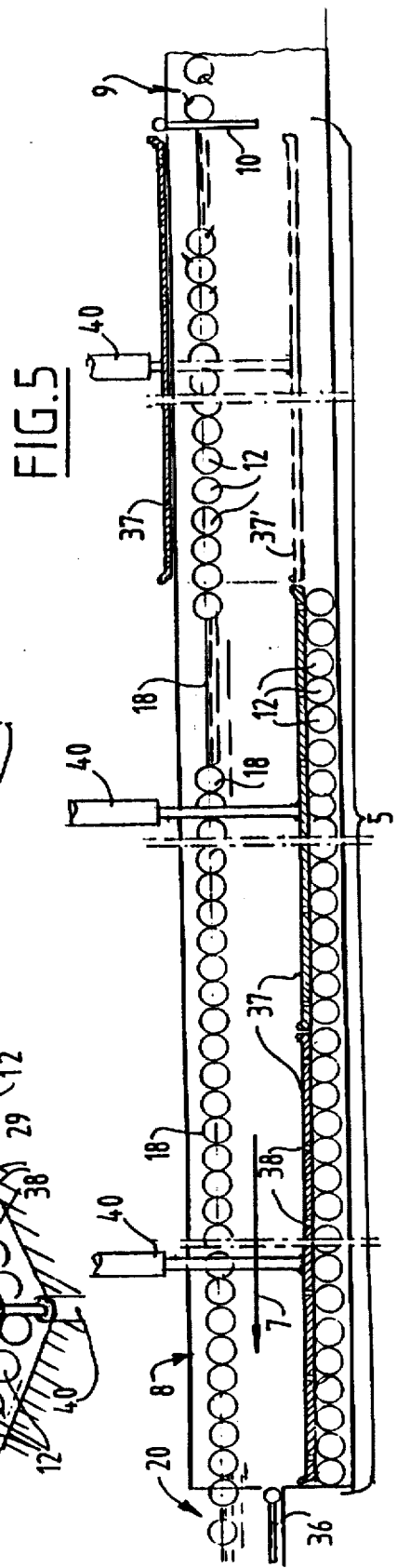

METHOD AND APPARATUS FOR HANDLING AGRICULTURAL OR HORTICULTURAL PRODUCE

BACKGROUND OF THE INVENTION

The invention relates to a method for handling agricultural or horticultural produce, for instance tomatoes or apples, wherein the products are transported in at least one reservoir filled with water substantially at a transporting level determined by the water surface in accordance with at least one transport path in the direction from a supply to a discharge. Such a method is known and is used for instance between a sorting station and a packing station. The space required for transport paths increases with the number of product classes.

SUMMARY OF THE INVENTION

The invention provides a method wherein the required transporting space is reduced. To this end the method according to the invention has the feature that in order to buffer products an upper level of at least one product mass is carried by a level adjusting buffering mechanism to a level other than the transporting level.

The invention also relates to and provides an apparatus which includes a level adjusting buffering mechanism for carrying an upper level of at least one product mass to a level other than the transporting level.

BRIEF DESCRIPTION OF THE DRAWINGS

The invention will be elucidated in the description following hereinbelow with reference to a drawing. In the drawing in schematic form:

FIG. 4 shows a detail corresponding with FIG. 3 of another apparatus according to the invention;

FIG. 5 is a lengthwise section of a detail of yet another apparatus according to the invention;

DESCRIPTION OF THE PREFERRED EMBODIMENT

Figure 1:
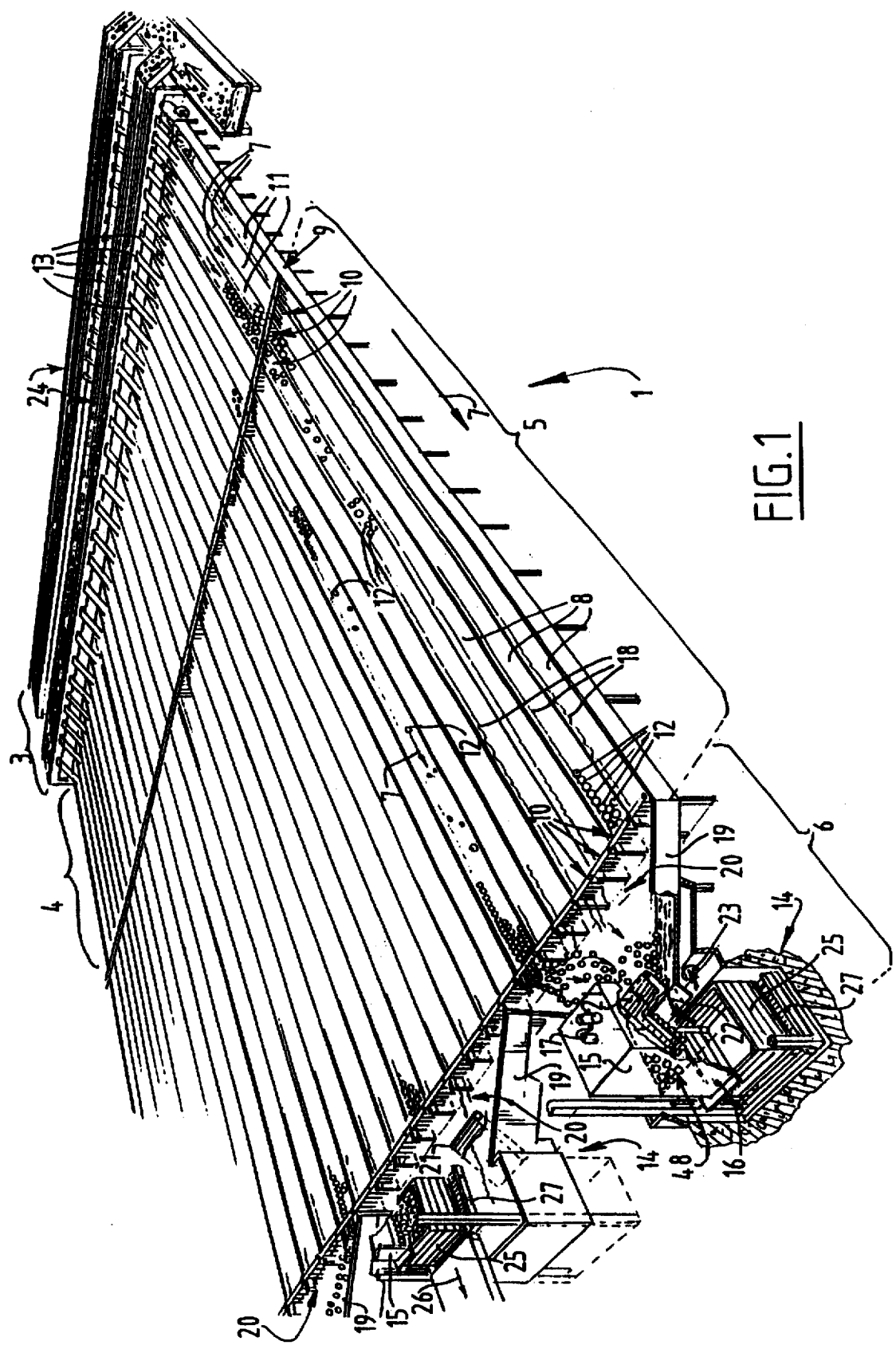
FIGS. 1 and 2 show a perspective view of a known apparatus respectively an apparatus according to the invention.
Figure 2:
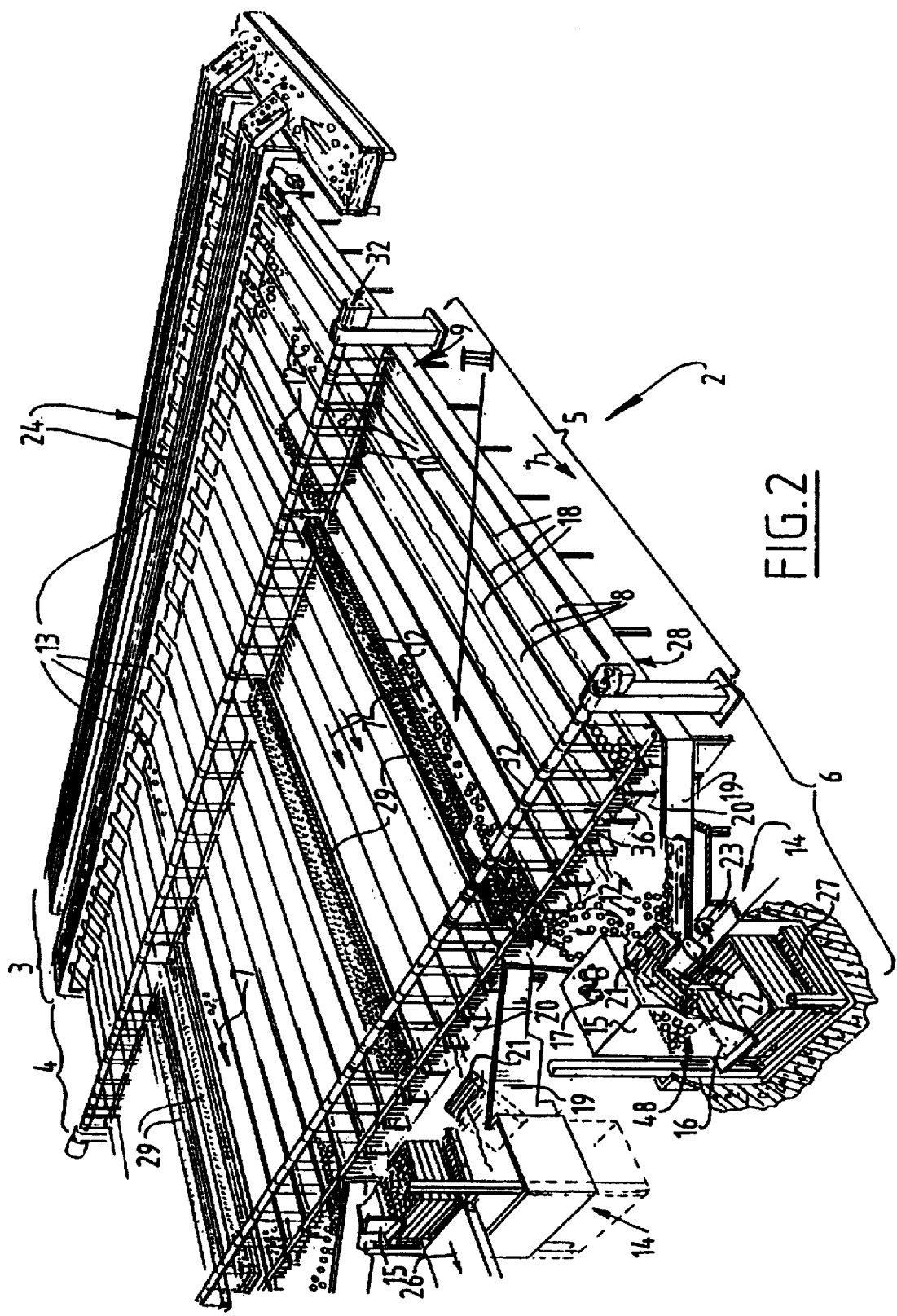

The known apparatus 1 of FIG. 1 and the apparatus 2 according to the invention of FIG. 2 each comprise successively in transporting direction 7 a per se known sorting station 3 with a waiting area 4, a transporting area 5 and a per se known packing station 6. Products 12 are transported in the transporting area 5 at the level of the water surface 18 in a reservoir 28 filled with water, this in parallel mutually separated lanes 8, of which a supply 9 closable by means of closing means 10 communicates with a lane 11 of the waiting area 4, which likewise consists of a part of the water-filled reservoir 28. These lanes 11 receive in each case a determined class of products 12 from a sorting outlet 13 of sorting devices 24. The packing station 6 comprises one or more packing devices 14 which are each connected onto the outlet 20 of a plurality of lanes 8 via closing means formed by racks 36. Each known packing device 14 comprises a bell-like vessel 15, the open underside 16 of which is situated under the water surface 18. In a filling process air is drawn off through a pipe 17 so that the water level 48 in the bell-like vessel 15 rises, while products 12 are meanwhile transported in a horizontal funnel 19 from an opened outlet 20 of a lane 8 of the transporting area 5 to a position below a downward inclining conveyor belt 21 which carries products 12 beneath the vessel 15 as according to arrow 22. All this transport is influenced by a water transport in arrow direction 7, wherein water is drained to the packing station 6 through pipes 23 which transport the water into the waiting area 4 via pumping means (not drawn) close to the sorting station 3.

When all products 12 from a determined lane 8 have arrived in the bell-like vessel 15, a crate 25 standing under the vessel 15 is raised and the products 12 are admitted from the vessel 15 into crate 25 by admitting air into the vessel 15. The filled crate 25 is discharged as according to arrow 26 from below the raised bell-like vessel 15 and an empty crate 25 is placed on the lifting platform 27 and carried downward below the water surface 18.

Each sorting device 24 of sorting station 3 carries the products 12 sorted per product class into a determined lane 11, wherein weight, quality, volume and/or colour of each product 12 is determined, while the number of products 12 delivered into each particular lane 11 is also counted. The quantity received per lane 11 is thus determined in known manner and, with the racks 10 closed, is temporarily retained in the lane 11 until the lane 8 connected thereto is free of products 12 of a preceding product mass packed into a crate 25.

One determined lane 8 is emptied at a time so that the products 12 in the loading station are packed in the same crate 25. The other lanes 8 are meanwhile filled with a quantity of products 12 which corresponds with the requisite volume of a crate 25. The lanes 8 in FIG. 1 are sufficiently long for this purpose.

Figure 3:
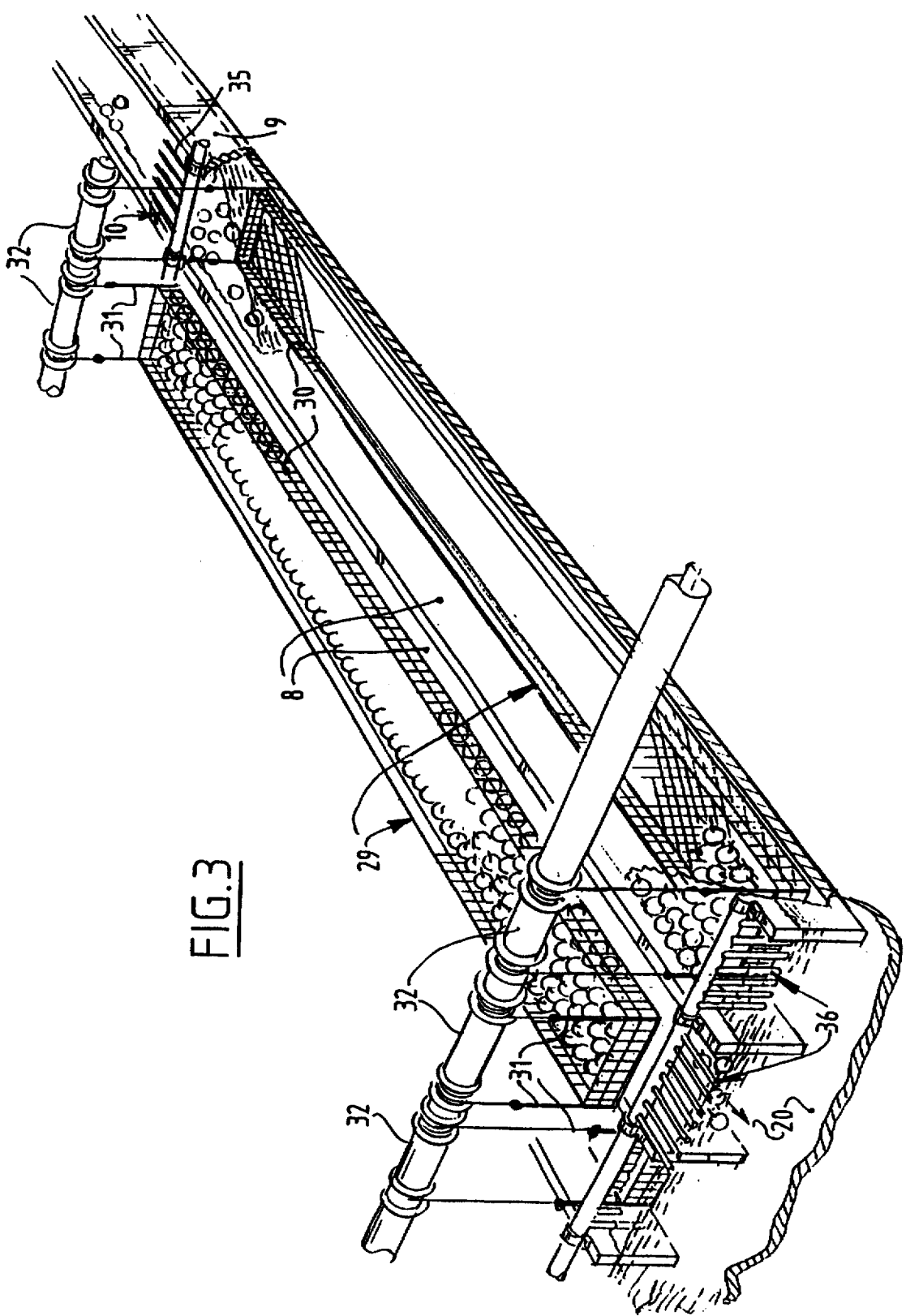
FIG. 3 shows on larger scale detail III of FIG. 2.
Figure 6:
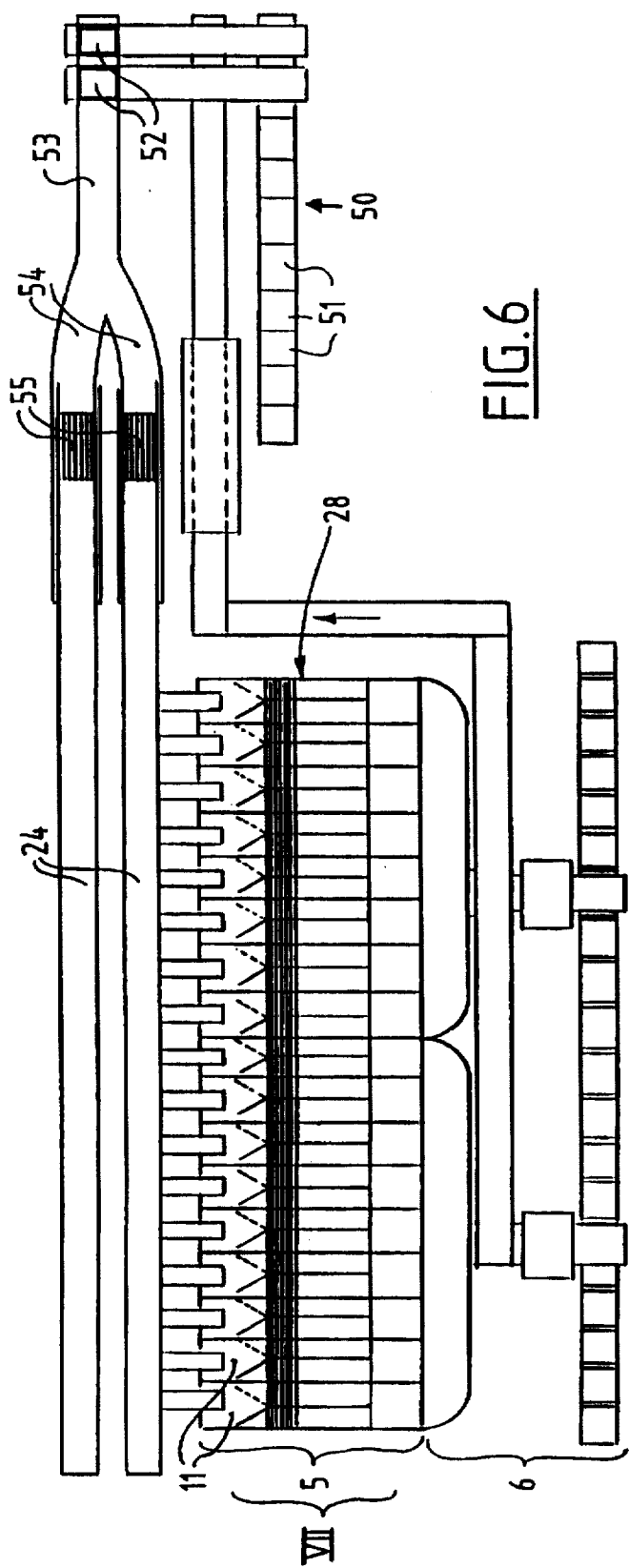
FIG. 6 shows a top view of yet another apparatus according to the invention.
Figure 7:
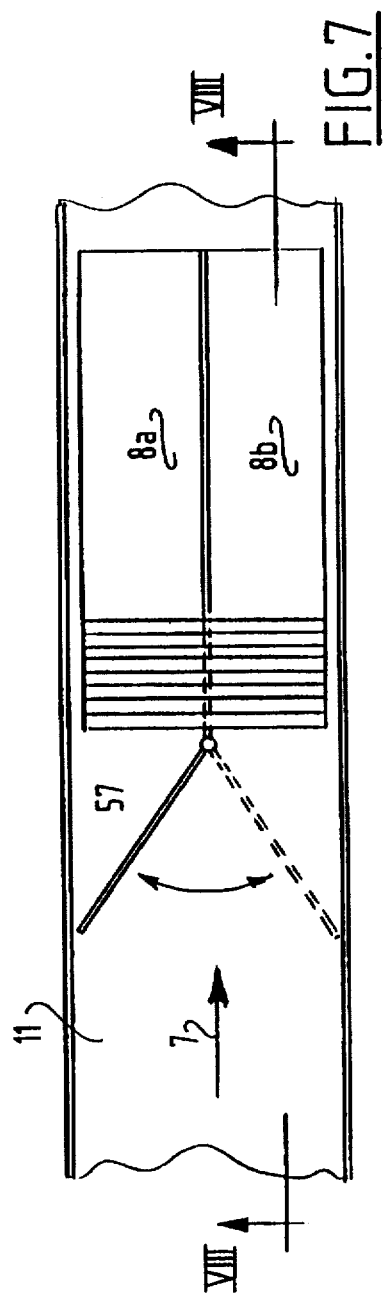
FIG. 7 shows on larger scale detail VII of FIG. 6.
Figure 8:
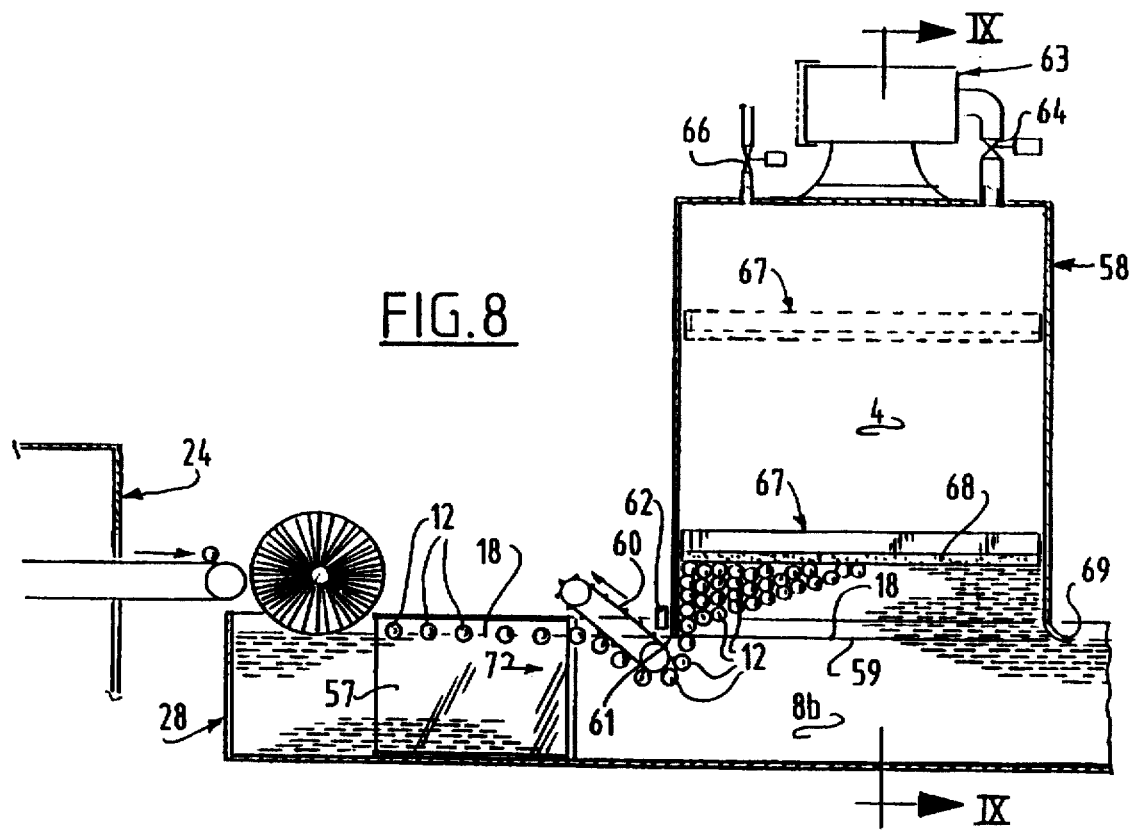
FIG. 8 shows a section along line VIII—VIII of FIG. 7.
Figure 9:
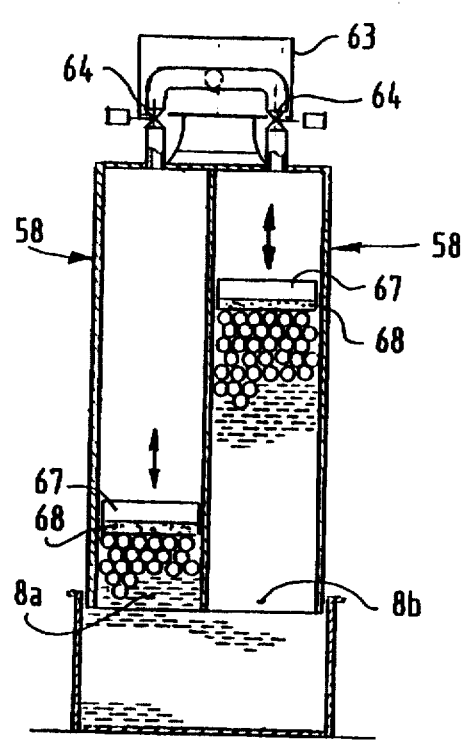
FIG. 9 shows section IX—IX of FIG. 8.

In contrast thereto the lanes 8 in FIG. 2 are short since they are each provided with buffering means 29 for buffering products 12 at another level than the level of the water surface 18. These buffering means 29 consist according to FIG. 3 of an elongate basket 30 which is suspended via hoisting cables 31 from drivable winch drums 32. When roughly half a crate volume is present in a lane 8, all products 12 thereof are lifted above the normal transporting level 18 defined by the water surface 33 of lanes 8 and the second half of a crate volume is then admitted into this lane 8. After a total crate volume is situated in the position of lane 8—albeit at two different levels—the feed 9 through the closing means consisting of an upward foldable rack 10 is closed.

During filling of a crate 25 the closing means of the outlet 20 consisting of an upward foldable rack 36 is opened and the second half of the crate volume is first transported into the packing station 6 and the lifted first half is then lowered together with the basket 30 into the water of lane 8 and transported at transporting level 18 to packing station 6.

It is conceivable that above each lane 8 two or more baskets 30 are arranged one above another filled with products 12 and for emptying and filling purposes are lowered to below transporting level in the water of the associated lane 8. These baskets 30 then preferably fit into one another with sloping walls for this purpose. The transport area 5 is then shortened correspondingly.

According to FIG. 4 the buffering means 29 consist of a platform 37 which is provided with holes 38 and which is adjustable by means of a fluid cylinder 40 between a rest position 37a situated well above the level of the water surface 18 and a wait position 37b urging the products 12 from the transporting level 18 to a waiting level 37b. Platform 37 has a surface area practically equal to the total area of a lane 8. With two or more platforms 37 more product masses can optionally be stacked one above another at different levels. When the lane 8 is emptied the uppermost product mass located at the level of the water surface 18 is then transported first to packing station 6 and then, with the platform 37 raised, the layer located thereunder. It is possible to combine one or more baskets 30 with one or more platforms 37. A platform 37 and/or a basket 30 can optionally also be employed per lane 11 in the waiting area 4, which can itself be seen as a transporting area.

According to FIG. 5 the transporting area 5 has per lane 8 three platforms 37 which are height-adjustable independently of each other and arranged mutually in line. When a lane 8 is emptied the product mass present at the level of water surface 18 is first discharged and thereafter successively fractions of the product mass located from right to left thereunder. The rack 10 can already be opened before the last product 12 of the preceding crate volume has left the lane 8. Control of racks 10 and 36 and cylinders 40 of platforms 37 and/or the winch drums 32 of the baskets 30 preferably takes place automatically by means of a computer subject to the data received from sorting station 3 relating to the quantities admitted to particular product classes.

The apparatus 49 of FIGS. 6–9, the elements of which are drawn to substantially the same scale, can be erected in a comparatively small space. This apparatus 49 comprises:

a store 50 of crates 51 with products 12 for sorting;

two crate emptying devices 52 which deposit products 12 in a water channel 53;

two feed channels 54 which are connected to water channel 53 and which each supply the products 12 to an infeed conveyor 55 of a sorting device 24;

a transporting area 5; and a packing station 6.

Of this apparatus 49 only the transporting area 5 is described in detail since according to the invention it is embodied in exceptional manner.

Each lane 11 of the large water reservoir 28 receives products 12 of a particular class from two sorting devices 24. By means of a diverter valve 57 products 12 are guided to a lane 8a or 8b. Each lane 8a, 8b has a bell-like vessel 58 of which the open bottom edge 59 is situated a little below the water level 18. The inlet of each vessel 58 has a downward inclining infeed belt 60 for the purpose of urging the products beyond the inlet edge 61. The inlet edge 61 contains a photocell 62 for detecting products 12. If products 12 are located there, a stronger vacuum is drawn in bell-like vessel 58 by means of a vacuum pump 63 via a valve 64 controlled by the photocell.

These bell-like vessels 58 form level changing means 29 for buffering of a considerable product mass on a small ground surface area. When products 12 must be discharged from a determined channel 8a, 8b to the packing station 6, air is admitted into a relevant bell-like vessel 58 via a controlled valve 66. In order to remove all the products 12 easily from a vessel 58 along a rounded outlet edge 69, the vessel has a float 67 with a soft underlayer 68. As a result of the use of two bell-like vessels 58 in separate lanes 8a, 8b per lane 11 the supply and discharge of products 12 of a determined product class supplied to a lane 11 can take place simultaneously.

I claim:

1. An apparatus for handling agricultural or horticultural products, comprising at least one reservoir having water therein for transporting products substantially at a transporting level of the water surface along at least one transport path in a direction from a supply to a discharge and a level adjusting buffering means for displacing to a level other than the transporting level and holding at least one portion of the products thereby buffering said at least one portion of the products and thereby maintaining free said at least one transport path to permit at least one other portion of the products to be conveyed past said at least one portion of the products along said at least one transport path.

2. An apparatus as claimed in claim 1, wherein the buffering means comprise at least the container liftable out of the reservoir.

3. An apparatus as claimed in claim 1, wherein the buffering means comprises a plurality of liftable containers.

4. An apparatus as claimed in claim 1, further including at least one sorting device on an infeed side and at least one packing device on a discharge side of a plurality of transport paths.

5. An apparatus as claimed in claim 2, further including a plurality of the liftable containers.

6. An apparatus as claimed in claim 2, wherein each said liftable container is formed as an elongated basket dimensioned to substantially fill a lane which forms at least part of one said transport path.

7. An apparatus as claimed in claim 1, further including means for automatically operating said level adjusting buffering means.

8. An apparatus for handling agricultural or horticultural products, comprising at least one reservoir having water therein for transporting products substantially at a transporting level of the water surface in accordance with at least one transport path in a direction from a supply to a discharge and a level adjusting buffering means for carrying the upper level of at least one product mass to a level other than the transporting level, wherein the buffering means comprise at least one container liftable out of the reservoir and wherein each said liftable container is formed as an elongated basket dimensioned to substantially fill a lane which forms at least part of one said transport path.

* * * * *

UNITED STATES PATENT AND TRADEMARK OFFICE
CERTIFICATE OF CORRECTION

PATENT NO.    : 5,704,733
DATED         : January 6, 1998
INVENTOR(S)   : Jacob Hendrik de Greef It is certified that error appears in the above-identified patent and that said Letters Patent is hereby corrected as shown below:

Claim 2 Column 4 Line 27 "at least the" should read --at least one--.

Signed and Sealed this

Twenty-eighth Day of April, 1998

Attest:

BRUCE LEHMAN

*Attesting Officer*

*Commissioner of Patents and Trademarks*